US006097165A

United States Patent [19]
Herron

[11] Patent Number: 6,097,165
[45] Date of Patent: Aug. 1, 2000

[54] METHOD AND APPARATUS FOR HANDLING BRAKE FAILURE IN VARIABLE FREQUENCY DRIVE MOTORS

[75] Inventor: Bradley Vinson Herron, Fort Worth, Tex.

[73] Assignee: Ace-Tronics, Fort Worth, Tex.

[21] Appl. No.: 09/128,063

[22] Filed: Aug. 3, 1998

(Under 37 CFR 1.47)

Related U.S. Application Data

[60] Provisional application No. 60/054,226, Aug. 4, 1997.

[51] Int. Cl.[7] .............................. H02H 7/08; B66D 5/00

[52] U.S. Cl. ......................... 318/372; 318/463; 318/563; 318/565; 318/371; 388/903; 188/162

[58] Field of Search .................................. 318/362, 370, 318/371, 372, 373, 461, 463, 464, 563, 565; 388/903, 907.5, 909; 188/158, 161, 162, 180; 254/264

[56] References Cited

U.S. PATENT DOCUMENTS

| | | | |
|---|---|---|---|
| 4,304,375 | 12/1981 | Builta et al. | 244/17.13 |
| 5,671,912 | 9/1997 | Langford et al. | 254/267 |

*Primary Examiner*—Bentsu Ro
*Attorney, Agent, or Firm*—Felsman Bradley Vaden Gunter & Dillon, LLD; James E. Bradley

[57] ABSTRACT

The variable frequency drive of a motor monitors pulse generator feedback while the motor is stopped and an electromechanical brake is set. When the pulse generator feedback exceeds a predetermined level indicative of brake failure, tie controller actuates the motor to operate in zero servo mode and maintain the load. An alarm is also sounded, allowing an operator to safely lower the load.

17 Claims, 1 Drawing Sheet

METHOD AND APPARATUS FOR HANDLING BRAKE FAILURE IN VARIABLE FREQUENCY DRIVE MOTORS

This application claims the benefit of U.S. Provisional Application Ser. No. 60/054,226, filed Aug. 4, 1997.

BACKGROUND OF THE INVENTION

1. Technical Field

The present invention relates generally to variable frequency driven motors and in particular to brake systems within variable frequency driven motors. Still more particularly, the present invention relates to a method and apparatus for responding to brake failure in variable frequency driven motors.

2. Description of the Related Art

Variable frequency driven motors are utilized for a variety ot lifting mechanisms, from overhead cranes and hoists to elevators. Typically, when a load supported by a variable frequency driven motor is to be held in suspension for a significant period of time, an external brake is set and the motor is disengaged from supporting the load. This allows savings in the power required to supporting the load using the motor and also saves the motor from unnecessary wear.

When a brake is employed to hold a load in suspension, various events may result in release of the load, including brake failure and inadvertent release. The brake may fail as a result of a broken spring or a failed brake shoe. Inadvertent release of the load may result from accidental closing of contacts during maintenance. In either case, the effect of dropping the load may be disastrous.

It would be desirable, therefore, to provide a mechanism for preventing a load elevated by a variable frequency driven motor and supported by a brake from dropping n the event of brake failure. It would further be advantageous if the mechanism could be incorporated into existing commercial embodiments of variable frequency driven motors without the introduction of additional components.

SUMMARY OF THE INVENTION

The variable frequency drive of a motor monitors pulse generator feedback while the motor is stopped and an electromechanical brake is set. When the pulse generator feedback exceeds a predetermined level indicative of brake failure, tie controller actuates the motor to operate in zero servo mode and maintain the load. An alarm is also sounded, allowing an operator to safely lower the load.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
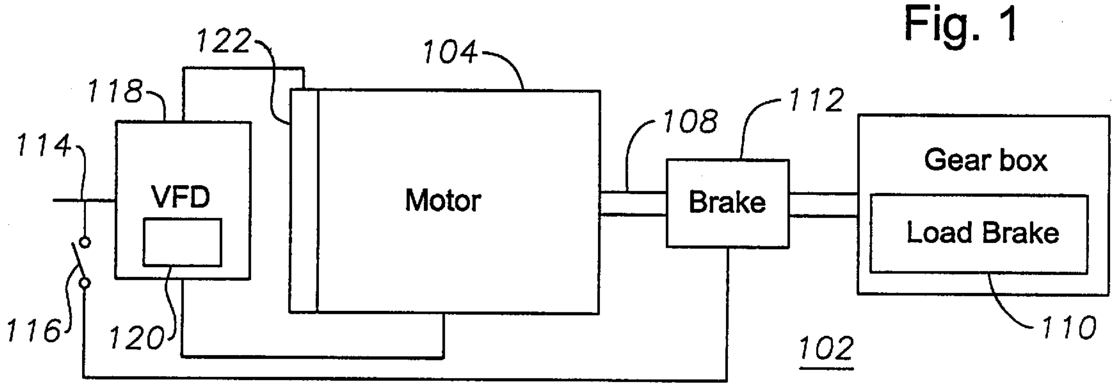
FIG. 1 depicts a variable frequency driven motor in accordance with a preferred embodiment of the present invention; arid

With reference now to the figures, and in particular with reference to FIG. 1, a variable frequency driven motor in accordance with a preferred embodiment of the present invention is depicted. The variable frequency driven motor 102 includes a motor 104 connected to a gear box 106 via a common shaft 108. Gear box 106 may optionally include a Load brake 110 designed to retard loads from falling when zero torque is applied by motor 104. Selectively operable on shaft 108 is an electromechanical brake 112, which may support loads when motor 102 is stopped and/or applying zero torque. Brake 112 is electrically connected to an input 114 from an external power source (not shown) via switch 116, which actuates brake 112.

Motor 104 receives power from variable frequency drive controller 118, which is also connected( to input 114 from the external power source. Variable frequency drive 118 is preferably a flux vector technology drive employing a mathematical model followed by the drive in controlling the operation of motor 104. Such drives are known in the art, and drives manufactured by Saftronics, Inc., for example, may be employed for variable frequency drive 118. Variable frequency drive 118 includes a memory 120 which is selectively programmable to control operation of variable frequency drive 118.

Variable frequency drive 118 receives feedback from pulse generator 122 (also sometimes called a “motor encoder” or “motor position encoder”) attached to or forming a part of motor 104. Pulse generator 122 is preferably a 1024 pulse-per-revolution (ppr) pulse generator. Feedback from pulse generator 122 allows variable frequency drive 118 to operate rotor 104 in zero servo (or “load float”) mode, in which motor 104 applies torque to a load at zero speed. This is a known advantage of closed loop drives over open-loop controllers.

Through instructions stored in memory 120, variable frequency drive 118 is programmed to operate as described below for handling of brake failure.

Figure 2:
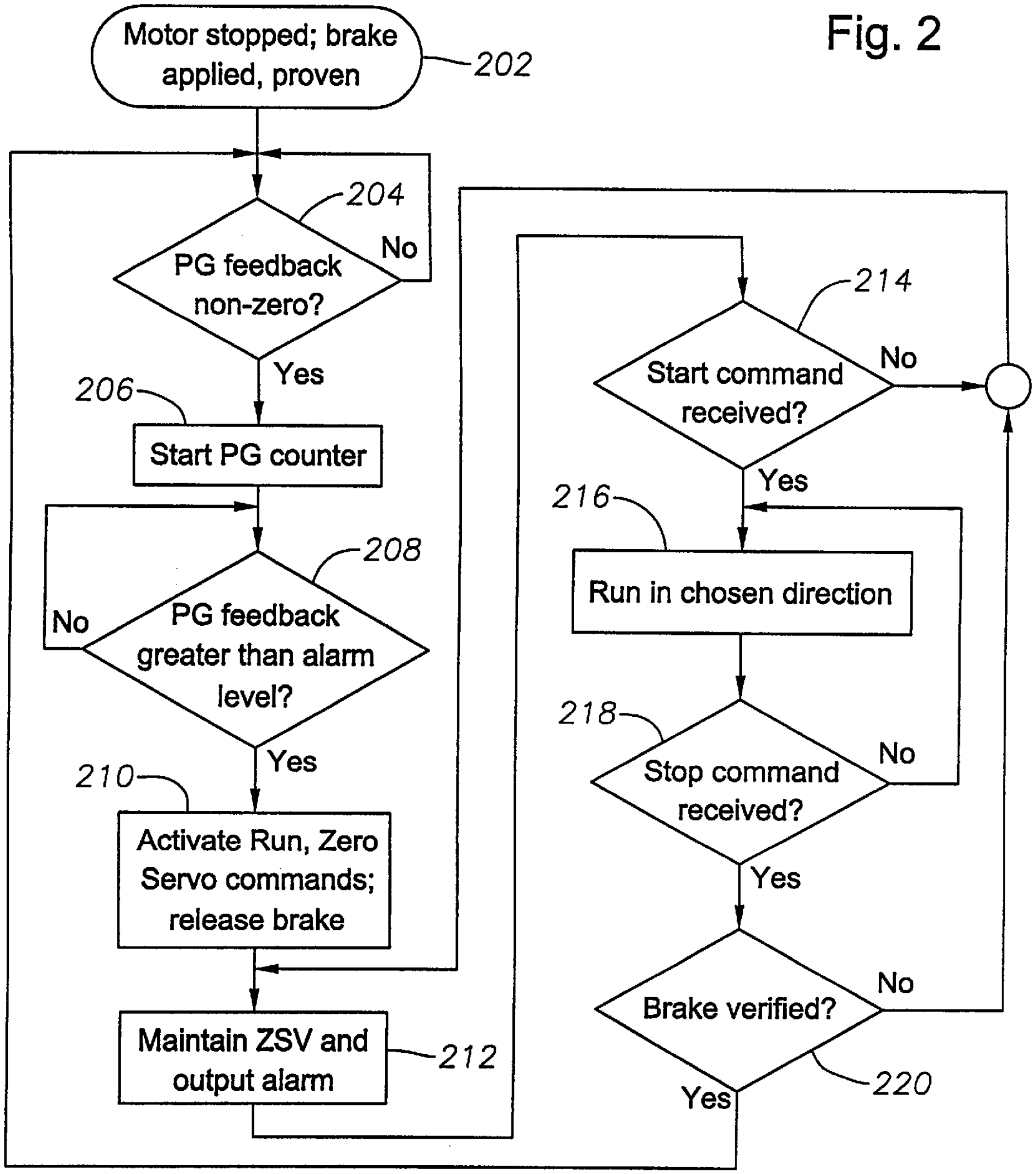
FIG. 2 is a high level flowchart for a process of handling brake failure in a variable frequency driven motor in accordance with a preferred embodiment of the present invention.

Referring to FIG. 2, a high level flowchart for a process of handling brake failure in a variable frequency driven motor in accordance with a preferred embodiment of the present invention is illustrated. The process begins at step 202, which depicts the motor being stopped, which conventionally means that the motor is run at zero speed for at least one second, and the electromechanical brake applied and proven. At this point, power to the motor is typically discontinued.

The process then passes to step 204, which illustrates monitoring of the pulse generator (“PG”) feedback. As long as no pulse generator feedback is received, conditions are deemed satisfactory and the process loops back to step 204 to continue monitoring pulse generator feedback. When nonzero pulse generator feedback is detected, indicating movement of the load causing, in turn, movement of the motor, the process passes to step 206, which illustrates starting the pulse generator counter, in which a measurement of the pulse feedback from the pulse generator is stored. In some commercial embodiments of variable frequency drives, the register in which this value is stored is not normally accessible when the motor is stopped. However, the register may be located and suitable modifications made to permit the pulse generator count value stored in the register to be read while the motor is stopped.

The process then passes to step 208, which depicts a determination of whether the pulse generator feedback exceeds a predetermined alarm level. The alarm level may be selected based on the sensitivity of the pulse generator and the desired allowance for load shifting due to external influences. For a 1024 ppr pulse generator, a suitable alarm level would be 10 pulses or more within a 50 millisecond period. As long as the pulse generator feedback does not exceed the selected alarm level, the process continues to simply monitor pulse generator feedback. Optionally, should the pulse generator feedback fall to zero, the process may return to step 204, described above.

If the pulse generator feedback exceeds the predetermined alarm level, the process proceeds from step 208 to step 210, which illustrates activating the Run and Zero Servo commands (or equivalents) for the variable frequency drive. The Run command may be employed to generate sufficient torque to return the motor to its position prior to the pulse generator exceeding the alarm limit, or merely to generate sufficient torque to maintain the motor in zero servo mode. Step 210 also illustrates releasing the electromechanical brake, so that the motor is independently holding the load.

The process then passes to step 212, which depicts maintaining the zero servo value (ZSV) of the motor position and outputting an alarm. An operator may then take control of the device in which the motor and variable frequency drive are utilized and safely lower the load. The process then passes to step 214, which illustrates a determination of whether a Start command has been received from the operator controls. If not, the process returns to step 212 and continues maintaining the load and outputting an alarm. If so, however, the process passes instead to step 216, which depicts run the motor in the chosen direction in response to operator command.

The process next passes to step 218, which depicts a determination of whether a Stop command has been received. If not, the process returns to step 216 and continues running the motor in the direction chosen. Once the stop command is received, the process proceeds instead to step 220, which illustrates a determination of whether the brake has been set and verified. If not, the process returns to step 212, maintaining the zero servo position of the motor and outputting an alarm to indicate continued brake failure. If the brake has been verified, however, the process returns instead to step 204, continuing monitoring the pulse generator feedback.

The present invention provides a mechanism for handling brake failure or inadvertent release in variable frequency drive motors. When movement of a suspended load is detected, indicating brake failure or release, the motor is actuated to provide sufficient torque to independently support the load. An alarm is then sounded to allow an operator to safely lower the load.

Various features may be desirable in specific implementations of the present invention. For example, most controllers provide a motor overload fault condition, in which a brake is applied and the motor stopped when motor overcurrent is detected. It may be desirable to disable this control when a brake failure is detected and being handled by the present invention. That is, it may be preferably to allow the motor to burn itself out supporting the load rather than permit the load to be dropped due to brake failure.

It is important to note that while the present invention has been described in the context of a fully functional variable frequency driven motor, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of handling brake failure in a variable frequency drive motor maintaining a load, comprising:

monitoring pulse generator feedback while the motor is stopped;

comparing the pulse generator feedback to a predetermined alarm level indicative of brake failure; and responsive to determining that the pulse generator feedback exceeds the alarm level, actuating the motor in zero servo mode to maintain the load.

2. The method of claim 1, wherein the step of monitoring pulse generator feedback while the motor is stopped further comprises:

monitoring pulses from a 1024 pulse per revolution motor position encoder.

3. The method of claim 1, wherein the step of comparing the pulse generator feedback to a predetermined alarm level indicative of brake failure further comprises:

comparing the pulse generator feedback to an alarm level of 10 pulses or more within a 50 millisecond period.

4. The method of claim 1, wherein the step of actuating the motor in zero servo mode to maintain the load further comprises:

actuating the motor to apply torque to a member supporting the load at zero speed.

5. The method of claim 1, further comprising:

responsive to determining that the pulse generator feedback exceeds the alarm level, sounding an alarm.

6. The method of claim 1, further comprising:

responsive to determining that the pulse generator feedback Exceeds the alarm level, disabling a motor overload fault condition and stopping the motor when motor overcurrent is detected.

7. A mechanism for handling brake failure in a variable frequency drive motor maintaining a load, comprising:

a variable frequency drive motor;

a pulse generator coupled to the motor and generating feedback signals corresponding to movement of the motor;

a controller monitoring the pulse generator feedback signal while the motor is stopped, comparing the pulse generator feedback signal to a predetermined alarm level indicative of brake failure, and, responsive to determining that the pulse generator feedback signal exceeds the alarm level, actuating the motor in zero servo mode.

8. The mechanism of claim 7, wherein the pulse generator is a 1024 pulse per revolution motor position encoder.

9. The mechanism of claim 7, wherein the predetermined alarm level indicative of brake failure comprises 10 pulses or more within a 50 millisecond period.

10. The mechanism of claim 7, wherein the controller, responsive to determining that the pulse generator feedback signal exceeds the alarm level, actuates the motor to apply torque to a member supporting a load at zero speed.

11. The mechanism of claim 7, further comprising:

an alarm sounded by the controller in response to determining that the pulse generator feedback signal exceeds the alarm level.

12. The mechanism of claim 7, further comprising:

a motor overload fault switch stopping the motor when motor overcurrent is detected, the motor overload fault switch disable by the controller in response to determining that the pulse generator feedback signal exceeds the alarm level.

13. A computer program product within a computer usable medium, comprising:

instructions for monitoring pulse generator feedback from a variable frequency drive motor maintaining a load while the motor is stopped;

instructions for comparing the pulse generator feedback to a predetermined alarm level indicative of brake failure; and instructions, responsive to determining that the pulse generator feedback exceeds the alarm level, for actuating the motor in zero servo mode to maintain the load.

14. The computer program product of claim 13, wherein the instructions for monitoring pulse generator feedback while the motor is stopped further comprise:

instructions for monitoring pulses from a 1024 pulse per revolution motor position encoder.

15. The computer program product: of claim 13, wherein the instructions for comparing the pulse generator feedback to a predetermined alarm level indicative of brake failure further comprise:

instructions for comparing the pulse generator feedback to an alarm level of 10 pulses or more within a 50 millisecond period.

16. The computer program product of claim 13, wherein the instructions for actuating the motor in zero servo mode to maintain the load further comprises:

instructions actuating the motor to apply torque to a member supporting the load at zero speed.

17. The computer program product of claim 13, wherein the instructions are maintained within a memory for a controller controlling the motor.

* * * * *

UNITED STATES PATENT AND TRADEMARK OFFICE

CERTIFICATE OF CORRECTION

PATENT : 6,097,165

DATED : August 1, 2000

INVENTOR(S) : Bradley Vinson Herron

It is certified that error appears in the above-identified patent and that said Letters Patent is hereby corrected as shown below:

On the title page, delete "[73] Assignee: Ace-Tronics, Fort Worth, Tex.".

Signed and Sealed this

Seventh Day of November, 2000

*Attest:*

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 6,097,165
DATED : August 1, 2000
INVENTOR(S) : Bradley Vinson Herron It is certified that error appears in the above-identified patent and that said Letters Patent is hereby corrected as shown below:

Title page,
The assignees should be Ace-Tronics, Fort Worth, Texas and Saftronics, Inc., Fort Myers, Florida.

This certificate supercedes certificate of correction issued November 7, 2000

Signed and Sealed this

Thirtieth Day of October, 2001

*Attest:*

Nicholas P. Godici

NICHOLAS P. GODICI

*Attesting Officer* *Acting Director of the United States Patent and Trademark Office*